US012662400B2

(12) United States Patent
Walton et al.

(10) Patent No.: US 12,662,400 B2
(45) Date of Patent: Jun. 23, 2026

(54) PLASMA-ENABLED LIQUID FILTRATION AND DECONTAMINATION

(71) Applicant: The Government of the United States of America, as represented by the Secretary of the Navy, Arlington, VA (US)

(72) Inventors: Scott G. Walton, Fairfax, VA (US); William A. Maza, Silver Spring, MD (US); Michael J. Johnson, Annapolis, MD (US); David R. Boris, Annandale, VA (US); Vanessa M. Breslin, Branford, CT (US); Grant C. Daniels, Burke, VA (US); Robert B. Balow, Mount Ranier, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 706 days.

(21) Appl. No.: 18/177,850

(22) Filed: Mar. 3, 2023

(65) Prior Publication Data
US 2023/0278896 A1    Sep. 7, 2023

Related U.S. Application Data

(60) Provisional application No. 63/316,430, filed on Mar. 4, 2022.

(51) Int. Cl.
*C02F 1/46*        (2023.01)
*C02F 1/00*        (2023.01)
*C02F 101/36*      (2006.01)

(52) U.S. Cl.
CPC ............ *C02F 1/4608* (2013.01); *C02F 1/001* (2013.01); *C02F 2101/36* (2013.01); *C02F 2201/46135* (2013.01); *C02F 2201/4616* (2013.01)

(58) Field of Classification Search
CPC .... C02F 1/4608; C02F 1/001; C02F 2101/36; C02F 2201/46135; C02F 2201/4616; C02F 1/283; C02F 1/42
See application file for complete search history.

(56) References Cited

U.S. PATENT DOCUMENTS

2020/0171409 A1* 6/2020 Cho ..................... B01J 20/3441

FOREIGN PATENT DOCUMENTS

| | | |
|---|---|---|
| JP | 2005515843 A | 6/2005 |
| KR | 100840935 B1 | 6/2008 |
| WO | 2020172132 A1 | 8/2020 |

OTHER PUBLICATIONS

Takeuchi, Nozomi et al., "Review of plasma-based water treatment technologies for the decomposition of persistent organic compounds", Japanese Journal of Applied Physics, Oct. 16, 2020.

(Continued)

*Primary Examiner* — Terry K Cecil
(74) *Attorney, Agent, or Firm* — US Naval Research Laboratory; Suresh Koshy

(57) ABSTRACT
Apparatus and method for decontaminating both contaminated waters and sorbent filter media, either separately or simultaneously, in a single system. Contaminants in a liquid flowing through a reaction chamber are removed by first generating a plasma within the liquid in the chamber, with the contaminants being broken into smaller particles at the interfaces between the generated plasma and the liquid. The combined plasma-liquid solution is then passed through a solid filter, which captures the smaller contaminant particles to decontaminate the liquid. To decontaminate the filter (Continued)

media, plasma flows through the filter material without the presence of liquid, the plasma reacting with the filter material to remove contaminants previously adsorbed by the filter.

8 Claims, 5 Drawing Sheets

(56)                    References Cited

OTHER PUBLICATIONS

E. M. Sunderland et al., "A Review of the Pathways of Human Exposure to Poly- and Perfluoroalkyl Substances (PFASs) and Present Understanding of Health Effects," J. Expo. Sci. Env. Epid. 2019, 29 (2), 131-147.

P. Grandjean et al., "Perfluorinated Alkyl Substances: Emerging Insights Into Health Risks. New Solutions," J Environ. Occup. Health Policy 2015, 25 (2), 147-163.

G. Goldenman et al., The Cost of Inaction: A Socioeconomic Analysis of Environmental and Health Impacts Linked to Exposure to PFAS. Nordic Council of Ministers: 2019.

K. Kato et al., "Trends in Exposure to Polyfluoroalkyl Chemicals in the U.S. Population: 1999-2008," Environ. Sci. Technol. 2011, 45 (19), 8037-8045.

X. Hu et al., "Detection of Poly- and Perfluoroalkyl Substances (PFASs) in U.S. Drinking Water Linked to Industrial Sites, Military Fire Training Areas, and Wastewater Treatment Plants," Environ. Sci. Technol. Lett. 2016, 3 (10), 344-350.

B. E. Blake et al., "Early Life Exposure to Per- and Polyfluoroalkyl Substances (PFAS) and Latent Health Outcomes: A Review Including the Placenta as a Target Tissue and Possible Driver of Peri- and Postnatal Effects," Toxicology 2020, 408, 152565.

A. Chohan et al., "Per and Polyfluoroalkyl Substances Scientific Literature Review: Water Exposure, Impact on Human Health, and Implications for Regulatory Reform," Rev. Environ. Health 2020, 1-25.

Y. Xu et al., "Associations between Serum Concentrations of Perfluoroalkyl Substances and DNA Methylation in Women Exposed through Drinking Water: A Pilot Study in Ronneby, Sweden," Environ. Int. 2020, 145 (September), 106148.

Y.-P. Kung et al., "Intrauterine Exposure to Per- and Polyfluoroalkyl Substances May Harm Children's Lung Function Development," Environ. Res. 2020, 110178.

M. Pfohl et al., "Perfluorooctanesulfonic Acid (PFOS) and Perfluorohexanesulfonic Acid (PFHxS) Alter the Blood Lipidome and the Hepatic Proteome in a Murine Model of Diet-Induced Obesity," Toxicol. Sci. 2020.

J. L. Domingo et al., "Human Exposure to Per-and Polyfluoroalkyl Substances (PFAS) Through Drinking Water: A Review of the Recent Scientific Literature," Environ. Res. 2019, 177.

J. Horst et al., "Water Treatment Technologies for PFAS: The Next Generation," Groundw. Monit. Remediat. 2018, 38 (2), 13-23.

G. Levitin et al., "Plasma cleaning for electronic, photonic, biological, and archeological applications," in Developments In Surface Contamination and Cleaning—vol. 5: Contaminant Removal and Monitoring, eds. Rajiv Kohli, K. L. Mittal, William Andrew (2012).

J. C. Whitehead et al., "Plasma-catalysis: the known knowns, the known unknowns and the unknown unknowns," J. Phys. D: Appl. Phys. 2016, 49, 243001.

D. B. Graves, "Low temperature plasma biomedicine: A tutorial review," Phys. Plasma 2014, 21, 080901.

See H. Zeghioud et al., "A. Review on Discharge Plasma for Water Treatment: Mechanism, Reactor Geometries, Active Species and Combined Processes," J. Water Process Eng. 2020, 38, 101664.

D. M. Wanninayake, "Comparison of currently available PFAS remediation technologies in water: A review," Journal of Environmental Management 2021, 283, 111977.

D. Palma et al., "State of the art and perspectives about non-thermal plasma applications for the removal of PFAS in water," Chem. Eng. J. Advance. 2022, 10, 100253.

I. Ross et al., "A Review of Emerging Technologies for Remediation of PFASs," Remed. J. 2018, 28 (2), 101-126.

C. D. Vecitis et al., "Treatment Technologies for Aqueous Perfluorooctanesulfonate (PFOS) and Perfluorooctanoate (PFOA)," Front. Environ. Sci. En. 2009, 3 (2), 129-151.

M. Y. Khan et al., "Decomposition Kinetics of Perfluorinated Sulfonic Acids," Chemosphere 2020, 238, 124615.

M. J. Johnson et al., "Low power degradation of perfluorooctane sulfonate (PFOS) in water using a nanosecond pulsed atmospheric pressure plasma," 2022 Plasma Sources Sci. Technol. 31 085001.

K. Tachibana et al., "Reaction Process of Perfluorooctanesulfonic Acid (PFOS) Decomposed by DC Plasma Generated in Argon Gas Bubbles," IEEE Trans. Plasma Sci. 2014, 42 (3), 786-793.

* cited by examiner

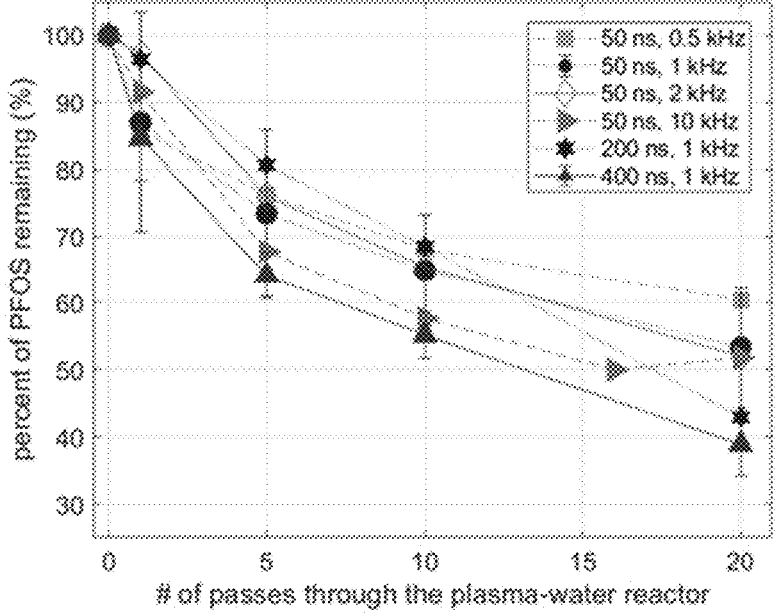
*FIG. 3A*
*FIG. 3B*
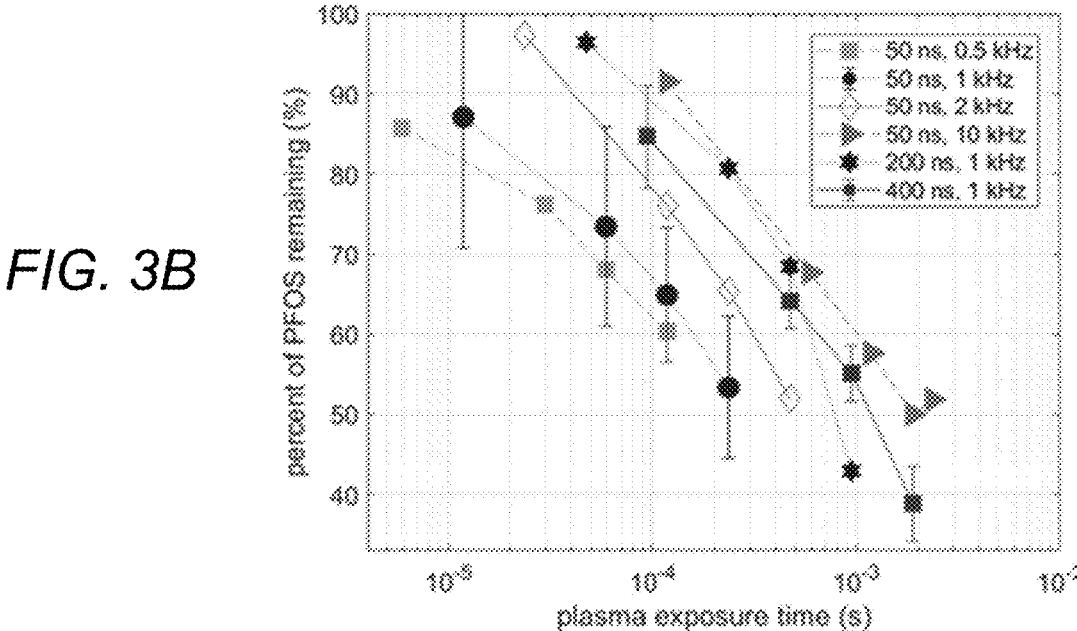

PLASMA-ENABLED LIQUID FILTRATION AND DECONTAMINATION

CROSS-REFERENCE

This Application is a Nonprovisional of and claims the benefit of priority under 35 U.S.C. § 119 based on U.S. Provisional Patent Application No. 63/316,430 filed on Mar. 4, 2022. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #210972.

TECHNICAL FIELD

The present invention relates to remediation of liquids, and in particular to a new approach to plasma-based remediation of liquids.

BACKGROUND

Poly- and perfluoroalkyl substances (PFAS) are a persistent and recalcitrant class of compounds. Their physical properties, particularly the high density of very stable C—F bonds comprising the backbone of these molecules, make them resistant to metabolic and chemical degradation, earning them the ominous moniker, "forever chemicals". Data suggests that continued exposure to PFAS may result in significant health risks. See E. M. Sunderland et al., "A Review of the Pathways of Human Exposure to Poly- and Perfluoroalkyl Substances (PFASs) and Present Understanding of Health Effects," *J. Expo. Sci. Env. Epid.* 2019, 29 (2), 131-147; and P. Grandjean et al., "Perfluorinated Alkyl Substances: Emerging Insights Into Health Risks. New Solutions," *J Environ. Occup. Health Policy* 2015, 25 (2), 147-163.

A report published recently by the Nordic Council of Ministers estimates that as of 2019, PFAS pollutant exposure has led to anywhere between 600 to 700 deaths in Nordic countries alone carrying a health cost of up to about $2.7 billion. See G. Goldenman et al., *The Cost of Inaction: A Socioeconomic Analysis of Environmental and Health Impacts Linked to Exposure to PFAS.* Nordic Council of Ministers: 2019. In the same report, healthcare costs and environmental damages arising from exposure to PFAS contaminants for the European Union are estimated to be $52-84 billion and $16.9 billion, respectively. Similar estimates were given for the US (i.e. $37-59 billion in health-care costs and $12.1 billion in environmental damages).

A 2011 paper on U.S. National Health and Nutrition Examination Survey data reported detectable PFAS concentrations in over 95% of tested individuals. See K. Kato et al., "Trends in Exposure to Polyfluoroalkyl Chemicals in the U.S. Population: 1999-2008," *Environ. Sci. Technol.* 2011, 45 (19), 8037-8045. Researchers have also found that the water supplies of 6 million U.S. residents exceeds the US EPA's lifetime health advisory for PFAS. See X. Hu et al., "Detection of Poly- and Perfluoroalkyl Substances (PFASs)

2 in U.S. Drinking Water Linked to Industrial Sites, Military Fire Training Areas, and Wastewater Treatment Plants," *Environ. Sci. Technol. Lett.* 2016, 3 (10), 344-350.

Importantly, research suggests that current regulations are not enough to prevent harm to vulnerable populations, such as infants and children. See B. E. Blake et al., "Early Life Exposure to Per- and Polyfluoroalkyl Substances (PFAS) and Latent Health Outcomes: A Review Including the Placenta as a Target Tissue and Possible Driver of Peri- and Postnatal Effects," *Toxicology* 2020, 408, 152565; A. Cho-han et al., "Per and Polyfluoroalkyl Substances Scientific Literature Review: Water Exposure, Impact on Human Health, and Implications for Regulatory Reform," *Rev. Environ. Health* 2020, 1-25; Y. Xu et al., "Associations between Serum Concentrations of Perfluoroalkyl Substances and DNA Methylation in Women Exposed through Drinking Water: A Pilot Study in Ronneby, Sweden," *Environ. Int.* 2020, 145 (September), 106148; Y.-P. Kung et al., "Intra-uterine Exposure to Per- and Polyfluoroalkyl Substances May Harm Children's Lung Function Development," *Environ. Res.* 2020, 110178; and M. Pfohl et al., "Perfluorooc-tanesulfonic Acid (PFOS) and Perfluorohexanesulfonic Acid (PFHxS) Alter the Blood Lipidome and the Hepatic Proteome in a Murine Model of Diet-Induced Obesity," *Toxicol. Sci.* 2020.

The increasing environmental footprint of PFAS has generated alarm among regulators, government agencies and, more recently, the general public. See J. L. Domingo et al., "Human Exposure to Per- and Polyfluoroalkyl Substances (PFAS) Through Drinking Water: A Review of the Recent Scientific Literature," *Environ. Res.* 2019, 177. Not surprisingly, a collective urgency has emerged to develope novel materials and technologies designed to remove PFAS from contaminated ground soil and water in a cost-effective and energy-efficient manner. See J. Horst et al., "Water Treatment Technologies for PFAS: The Next Generation," *Groundw. Monit. Remediat.* 2018, 38 (2), 13-23.

Plasmas are well-established tools in the synthesis and treatment of materials, largely due to their ability to produce a wide variety of unique chemically active and energetic species. Beyond materials and device fabrication, plasmas have been used to clean and decontaminate surfaces and to drive catalysis, and have even been applied to a variety of biomedical applications. See G. Levitin et al., "Plasma cleaning for electronic, photonic, biological, and archeologi-cal applications," in *Developments in Surface Contamination and Cleaning—Vol 5: Contaminant Removal and Monitoring*, eds. Rajiv Kohli, K. L. Mittal, William Andrew (2012); J. C. Whitehead et al., "Plasma—catalysis: the known knowns, the known unknowns and the unknown unknowns," *J. Phys. D: Appl. Phys.* 2016, 49, 243001; and D. B. Graves, "Low temperature plasma biomedicine: A tutorial review," *Phys. Plasma* 2014, 21, 080901. It is no wonder then that many researchers have endeavored to harness the unique capabilities of plasmas for applications such as water remediation and decontamination. See H. Zeghioud et al., "A. Review on Discharge Plasma for Water Treatment: Mechanism, Reactor Geometries, Active Species and Combined Processes," *J. Water Process Eng.* 2020, 38, 101664. This includes a number of efforts investigating the use of plasma to remediate PFAS-contaminated water. See D. M. Wanninayake, "Comparison of currently available PFAS remediation technologies in water: A review," *Journal of Environmental Management* 2021, 283, 111977; and D. Palma et al., "State of the art and perspectives about non-thermal plasma applications for the removal of PFAS in water," *Chem. Eng. J. Advance.* 2022, 10, 100253.

The fundamental problem with the plasma treatment of water is the challenge associated with increasing the penetration depth of the active plasma species into the bulk liquid. Indeed, the plasmas used for such efforts are produced from gaseous mediums and so the distribution of active species relies on their penetration into and diffusion throughout the water. For electrons, charged/neutral molecules, and radicals this diffusion length is often very short. Accordingly, large gas-liquid interfaces and low liquid volumes are needed where the plasma interacts with the liquid.

While progress on plasma-based remediation has been made, the current state-of-the-art of PFAS removal from ground soil and water involves filtration through granular activated carbon (GAC) or ion exchange (IX) resins. However, these have their own limitations. For example, Ross et al. summarized that 1) GAC demonstrates good retention of longer chain PFAS but performs poorly with shorter chain variants, 2) IX resins, on the other hand, tend to do better over a range of short PFAS chain lengths yet interact poorly with longer chain PFASs, and that 3) both GAC and IX resins display little activity towards C1 and C2 PFAS. See I. Ross et al, "A Review of Emerging Technologies for Remediation of PFASs," *Remed. J.* 2018, 28 (2), 101-126.

Regardless, these filter materials have a finite lifetime and thus require either replacement or regeneration. Regeneration of these used sorbent materials by non-thermal methods involves either an organic solvent rinse when treating hydrophobic media like GAC or high ionic strength salt solutions when treating IX resins. Unfortunately, these approaches are ineffective at fully regenerating the sorption capacity of the matrices due to inefficient desorption, while generating additional solvent waste.

A more effective approach is a thermal treatment, or combustion, of these materials at elevated temperatures (>400° C.). This, however, typically results in the formation of harmful degradation products such as HF, $CO_x$, $SO_x$, and volatile fluoroalkanes, as well as the destruction of the filtration media. See C. D. Vecitis et al., "Treatment Technologies for Aqueous Perfluorooctanesulfonate (PFOS) and Perfluorooctanoate (PFOA)," *Front. Environ. Sci. En.* 2009, 3 (2), 129-151; and M. Y. Khan et al., "Decomposition Kinetics of Perfluorinated Sulfonic Acids," *Chemosphere* 2020, 238, 124615.

Therefore, the development of in situ treatment technologies capable of destroying surface-bound contaminants under milder conditions while retaining bulk sorbent properties requires more attention.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a new approach to plasma-based remediation of liquids.

The apparatus and method of the present invention provides a means to plasma-treat both contaminated waters and solid sorbent media, either separately or simultaneously, in a single system.

The general concept described by this invention includes a sequential treatment of liquid flowing through the system whereby contaminants in a liquid can be removed by first exposing the liquid to a plasma and then passing the liquid through a solid filter.

The apparatus of the present invention can also be used to decontaminate the filter material. In such a case, a plasma is generated within the reaction chamber without the presence of a liquid. The plasma flows through the filter material and leaves the reaction chamber, with any contaminants from the liquid previously adsorbed by the filter being removed as the plasma reacts with the filter material.

Decontamination of a liquid in accordance with the present invention proceeds by first exposing the contaminated liquid to a plasma. The plasma serves to reduce or break apart the pollutant molecules (parent species) into smaller molecular fragments (daughter products) that may or may not be benign. In some cases the plasma can also drive chemical reactions that convert the parent pollutant species or daughter products into benign molecules that can be output from the chamber without harm to the environment. After its exposure to the plasma, the liquid flows through the filter region, where the parent species or the daughter products are adsorbed by the filtration media and removed from the water flow.

When the intended operation is to decontaminate the filter material, the water flow is stopped and only the plasma is allowed to diffuse through the filter region. As the plasma passes by the filter media, active species produced in the plasma interact with the filter media to desorb parent or daughter product adsorbates from the filter.

This new concept in plasma remediation combines plasma exposure and filtration to destroy or remove contaminants in water, while also providing the ability to independently destroy or remove the contaminants adsorbed on solid sorbents used as filtration media. The latter enables in situ regeneration of the filtration material for repeated use.

The apparatus and method described in this disclosure provides a means to address the PFAS contamination issue through a scalable process that combines direct plasma treatment with filtration to significantly reduce the level of PFAS contamination in both large and small water volumes.

The plasma can also be used to regenerate the filter media, in situ and without significant loss of material. The result is a more sustainable and less expensive approach that holds the potential for substantially increased decontamination efficacy.

Although the apparatus and method of the present invention were developed for the reduction of per- and polyfluoroalkyl substances (PFAS) in water, the principles behind the present invention can be applied to remediate other water contaminants, such as industrial dyes, pharmaceuticals, and herbicides.

BRIEF DESCRIPTION OF THE DRAWINGS

FIGS. 3A and 3B are plots illustrating reduction in PFOS as a function of the number of passes through the reaction chamber (FIG. 3A) and as a function of the exposure time of the liquid to the plasma (FIG. 3B) in a plasma-based decontamination method in accordance with the present invention.

5

Figure 4:
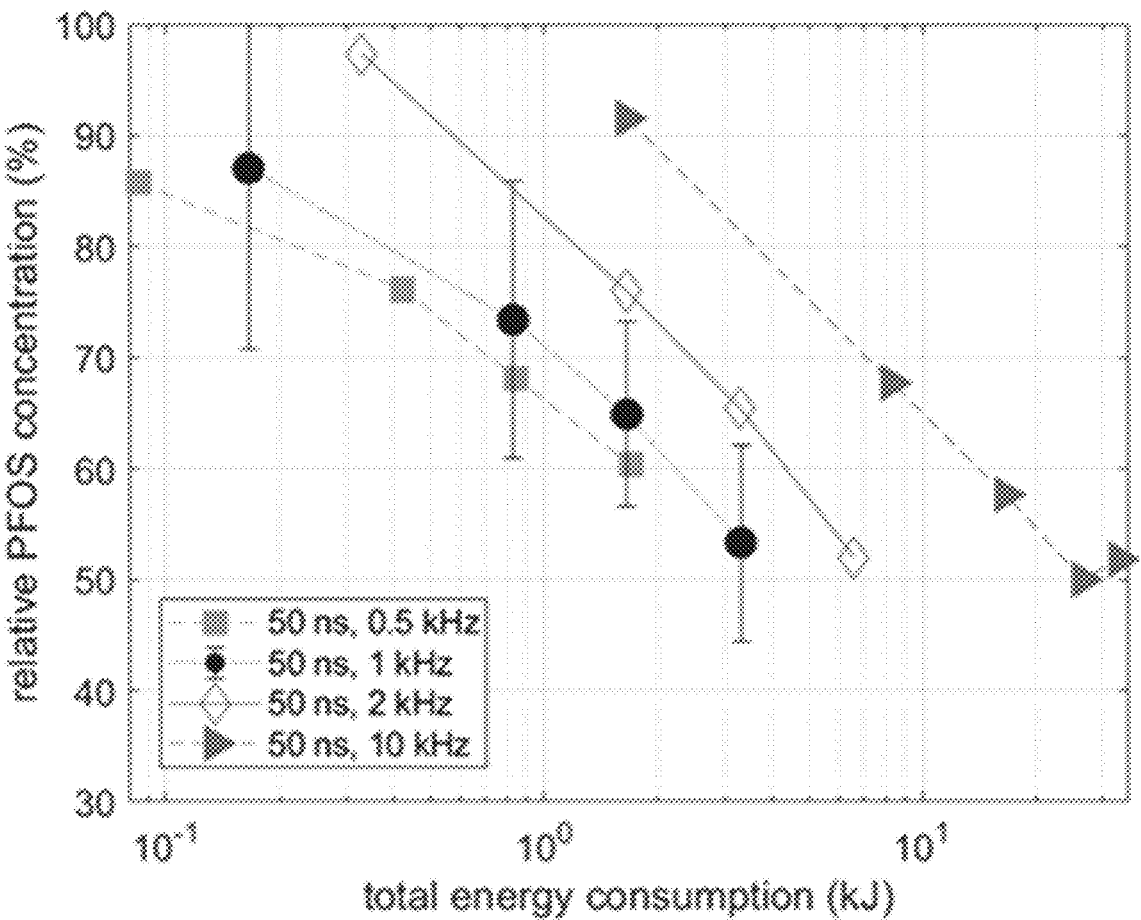

FIG. 4 is a plot illustrating the relative concentration of PFOS remaining in a liquid as a function of the energy required to drive a plasma in a plasma-based decontamination method in accordance with the present invention.

FIGS. 5A-5D are block schematics illustrating various additional embodiments of an apparatus for plasma-based water decontamination in accordance with the present invention.

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a new approach to plasma-based remediation of liquids.

The apparatus and method of the present invention provides a means to plasma-treat both contaminated waters and solid sorbent media, either separately or simultaneously, in a single system.

The general concept described by this invention includes a sequential treatment of liquid flowing through the system whereby contaminants in a liquid can be removed by first exposing the liquid to a plasma and then passing the liquid through a solid filter.

The apparatus of the present invention can also be used to decontaminate the filter material in situ within the reaction chamber. In such a case, the plasma flows through the filter material without the presence of a liquid, with adsorbed contaminants previously removed from the liquid being desorbed as it reacts with the filter material.

Decontamination of a liquid in accordance with the present invention proceeds by first exposing the contaminated liquid to a plasma. The plasma serves to reduce or break apart the pollutant molecules (parent species) into smaller molecular fragments (daughter products) that may or may not be benign. The plasma can take many forms, such as charged particle (ion and electrons), reactive radicals (molecular fragments), excited species (metastable atoms), and photons, and all of these plasma species can interact with contaminates to chemically or energetically break apart the parent molecules. In some cases the plasma can also drive chemical reactions that convert the parent pollutant species or daughter products into benign molecules that can be output from the reaction chamber without harm to the environment. After its exposure to the plasma, the liquid flows through the filter region, where any remaining parent species or the daughter products can be adsorbed by the filtration media and removed from the water flow. The filter media can be engineered to adsorb a wide range of contaminants or to optimize adsorption of one or more specified contaminants.

When the intended operation is to decontaminate the filter material, the water flow is stopped and only the plasma is allowed to diffuse through the filter region. As the plasma passes through the filter media, active species produced in the plasma, such as charged particles (ion and electrons), reactive radicals (molecular fragments), excited species (metastable atoms), and/or photons interact with the filter media to desorb parent or daughter product adsorbates from the filter. The desorption process can be driven by either energetic or chemical pathways as appropriate for the desorption of one or more given contaminants. The gas, along with the desorbed contaminants, then exits the reaction chamber to ready it for another cleaning cycle.

This new concept in plasma remediation combines plasma exposure and filtration to destroy or remove contaminants in water, while also providing the ability to independently destroy or remove the contaminants adsorbed on solid sorbents used as filtration media. The latter enables in situ regeneration of the filtration material for repeated use.

The apparatus and method described in this disclosure provides a means to address the contamination of liquids by per- and polyfluoroalkyl substances (PFAS) or perfluorooctane sulfonate (PFOS) through a scalable process that combines direct plasma treatment with filtration to significantly reduce the level of PFAS contamination in both large and small water volumes.

The plasma can also be used to regenerate the filter media, in situ and without significant loss of material. The result is a more sustainable and less expensive approach that holds the potential for substantially increased decontamination efficacy.

Although the apparatus and method of the present invention were developed for the reduction of PFAS and PFOS substances in water, the principles behind the present invention can be applied to remediate other contaminants in water or other liquids, such as industrial dyes, pharmaceuticals, and herbicides.

In addition, although the apparatus and method of the present invention are described in the context of the exemplary configurations shown in FIGS. 1 and 5A-5D herein, one skilled in the art will readily recognize that other components and configurations can be employed, and all such alternative components and configurations are deemed to be within the scope of the present invention.

Figure 1:
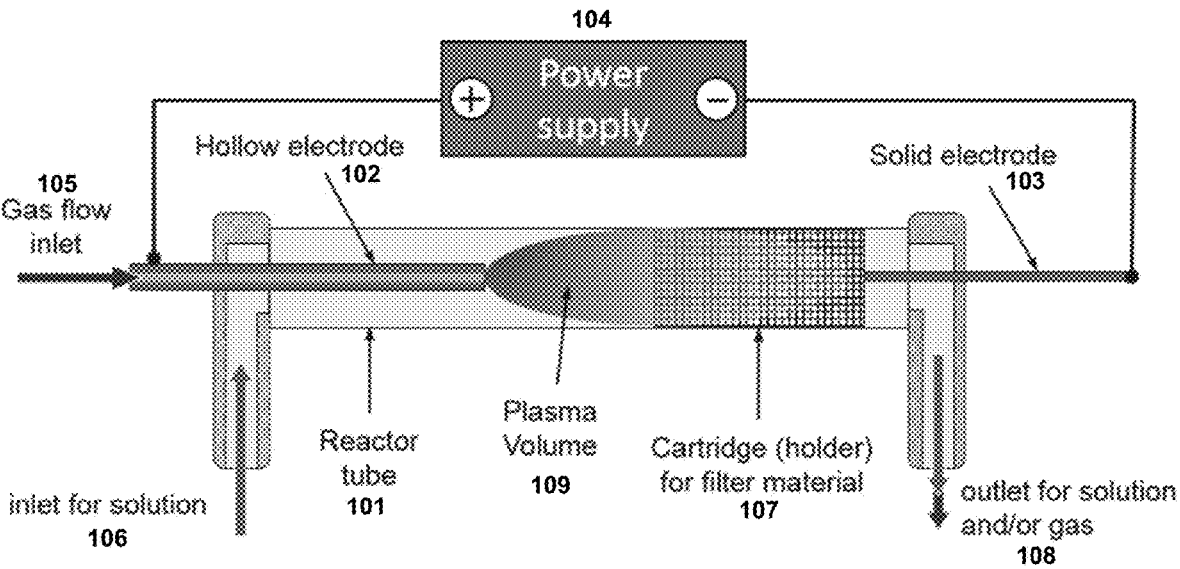
FIG. 1 is a block schematic illustrating aspects of an exemplary apparatus for plasma-based water decontamination in accordance with the present invention.

The block schematic in FIG. 1 illustrates aspects of an exemplary embodiment of an apparatus that can be used in a plasma-based water decontamination process in accordance with the present invention.

While the geometry and scale of the apparatus setup in accordance with the present invention can vary according to needs, as illustrated by the schematic in FIG. 1, the system comprises several defining components: a reaction chamber, two electrodes used to produce a plasma, and a filter. In the embodiment illustrated in FIG. 1, the reaction chamber is a cylindrical tube 101 having an inlet 106 at one end and an outlet 108 at the opposite end, the inlet and the outlet allowing liquid to flow from one end of the tube to the other. A hollow tube electrode 102, which both delivers gas into reaction chamber 101 and serves as an active electrode for plasma production, is at the inlet end of tube 101, and a solid electrode 103 is at the opposite end of reaction chamber 101. Reaction chamber 101 further contains a filter 107 comprising a filter material situated within a cartridge or other holder. The filter is located downstream from the active electrode such that the gas entering the reaction chamber must first pass through the filter material before leaving the reaction chamber.

In accordance with the present invention, a gas enters reaction chamber 101 via gas flow inlet 105 and travels through hollow tube electrode 102. As the gas flows through the reaction chamber, a voltage from power supply 104 is applied across electrodes 102 and 103 and generates a plasma volume 109 from the gas within the reaction chamber. As described in more detail below, a liquid then enters the reaction chamber via inlet 106 and surrounds the plasma volume 109. As the liquid contacts and interacts with the plasma, the plasma causes parent species contaminant molecules in the liquid to break apart into daughter particles comprising smaller molecular fragments. The liquid then flows through the filter 107, where remaining parent species and the daughter particles are adsorbed by the filter before the liquid exits the reaction chamber via outlet 108.

The design of the treatment apparatus allows the system to be operated in two distinct modes. The first mode is a liquid reduction or decontamination mode, in which gas and contaminated liquid flow through the reaction chamber simultaneously while the plasma is running. The second mode of operation is designed to regenerate the filter material via plasma exposure.

In the first mode, gas and contaminated liquid flow through the reaction chamber simultaneously. The gas enters the reaction chamber through electrode 102 while the liquid enters through inlet 106 and passes over electrode 102, which is submerged within the liquid in the reaction chamber. The gas used can be selected according to the liquid to be decontaminated, the type and extent of contamination, and/or an extent of decontamination to be achieved. Exemplary gases that can be used for decontamination of a liquid in accordance with the present invention include the noble gases, e.g., helium (He), xenon (Xe), argon (Ar), or neon (Ne); in other cases, the input gas can include reactive gases such as oxygen ($O_2$) or nitrogen ($N_2$), air, or mixtures of any of these gases.

The presence of both the gas and the liquid in the reaction chamber produces a significant amount of mixing of the gas and the liquid such that when the voltage from the power source is applied to the electrodes, a plasma volume can be generated from the gas, where the plasma volume is surrounded by the liquid and is highly interactive with the liquid, producing a plasma-liquid surface interface where the plasma extends into the liquid and/or the liquid extends into the plasma. As the liquid interacts with the plasma at these interfaces, the pollutant molecules (parent species) are reduced and/or are broken apart into smaller molecular fragments (daughter products). In some cases, the plasma can also drive chemical reactions that convert the parent pollutant species or daughter products into benign molecules that can be output from the reaction chamber without harm to the environment.

The gas/liquid mixture containing the plasma volumes generated as described above then flows through the filter material. The combination of the initial creation of the plasmas within the liquid to break apart or convert the contaminants in the liquid, plus the subsequent filtering step of the liquid in accordance with the present invention enhances the removal of remaining parent species and/or daughter products from the liquid. The filtering step can be optimized using both adjustments in operating parameters and choice of filter material. For example, the filter material can comprise granular activated carbon (GAC), ion exchange (IX) resins, or polymers, depending on the liquid to be treated and the level and/or type of contamination. The filter can be a single stage or can be multiple stages, with each stage being the same material or different, with the materials and configuration of the filter being designed to capture predetermined types of contaminants and/or to provide a predetermined level of decontamination. In addition, in some cases, the liquid to be treated can be cycled multiple times through the reaction chamber to provide additional decontamination before treatment of the liquid is complete. Because the plasma acts to break apart the parent molecules into smaller daughter products and the filter material serves to adsorb either parent or daughter products, both the plasma and filtration media can designed to maximize the removal of contaminants such that the optimum contaminant removal rate can exceed the removal rate provided by each step separately.

The second mode of operation is designed to regenerate the filter material in situ via plasma exposure within the reaction chamber. In this second mode, the liquid flow is turned off and gas is introduced into the reaction chamber 101 through hollow electrode 102 in a manner as described above. The gas may be different in this filter-regeneration operational mode compared with the liquid treatment mode and chosen to most effectively regenerate the filter material. For example, the gas used in this filter regeneration mode can be ambient air, $O_2$, $H_2$, halogen gases, or reactive gases, either alone or in combination with a noble gas, depending on the contaminants to be removed.

When a voltage from power supply 104 is applied to the hollow and solid electrodes 102 and 103, a plasma is formed as described above. The reactive by-products in the plasma (e.g., $O_3$, O, N, $NO_x$, H, OH) penetrate the porous filter material such that all surfaces of the filter are exposed to the reactive species, with the adsorbates (e.g. PFAS or PFAS fragments) on the surface of the filter material being desorbed as the plasma interacts with the material. The gas with the desorbed particles is then output from the reaction chamber via the outlet.

Once the filter material is regenerated by its exposure to the plasma, the system can be switched back to the water-treatment mode of operation by re-engaging the liquid flow. In fact, switching between modes of operation is largely controlled by liquid and gas valves and requires no opening of the reaction chamber, unlike conventional decontamination systems, which require that the filter be removed from the chamber for cleaning and/or replacement, with the attendant risk of contamination of the environment due to leakage from the filter.

While the system is relatively straightforward in design, adding a filter or sorbent materials within a plasma system does require certain considerations, as the geometry of the device and plasma generation need to be tailored to accommodate the filter. The conductivity and structure of the filter material are important. Charging, particularly around structures on the surface of the sorbent materials can influence plasma operation. In the extreme, arcing can occur at these locations. Such phenomena can cause the plasma to transition to a different mode, which can produce high currents and temperatures, thus damaging system components and/or rapidly eroding the filter material.

The issue can be avoided by the appropriate selection of filter materials, support structures, or plasma power. Identifying or engineering filter material to meet these criteria can be a challenge. Good sorption characteristics must be balanced against good physical properties and response to plasma exposure. Fortunately, issues like mode transition and arcing can be prohibited using short duration high voltage pulses, operating at a favorable frequency. While this might seem counterintuitive to achieving rapid and efficient remediation, the results shown by the plot in FIG. 4, which shows the relative concentration of PFOS remaining in the liquid as a function of the energy required to drive the plasma, indicate that the optimal conditions for remediation are, surprisingly, achieved with the lowest frequency, short duration pulses. See M. J. Johnson et al., "Low power degradation of perfluorooctane sulfonate (PFOS) in water using a nanosecond pulsed atmospheric pressure plasma," 2022 *Plasma Sources Sci. Technol.* 31 085001.

Figure 2:
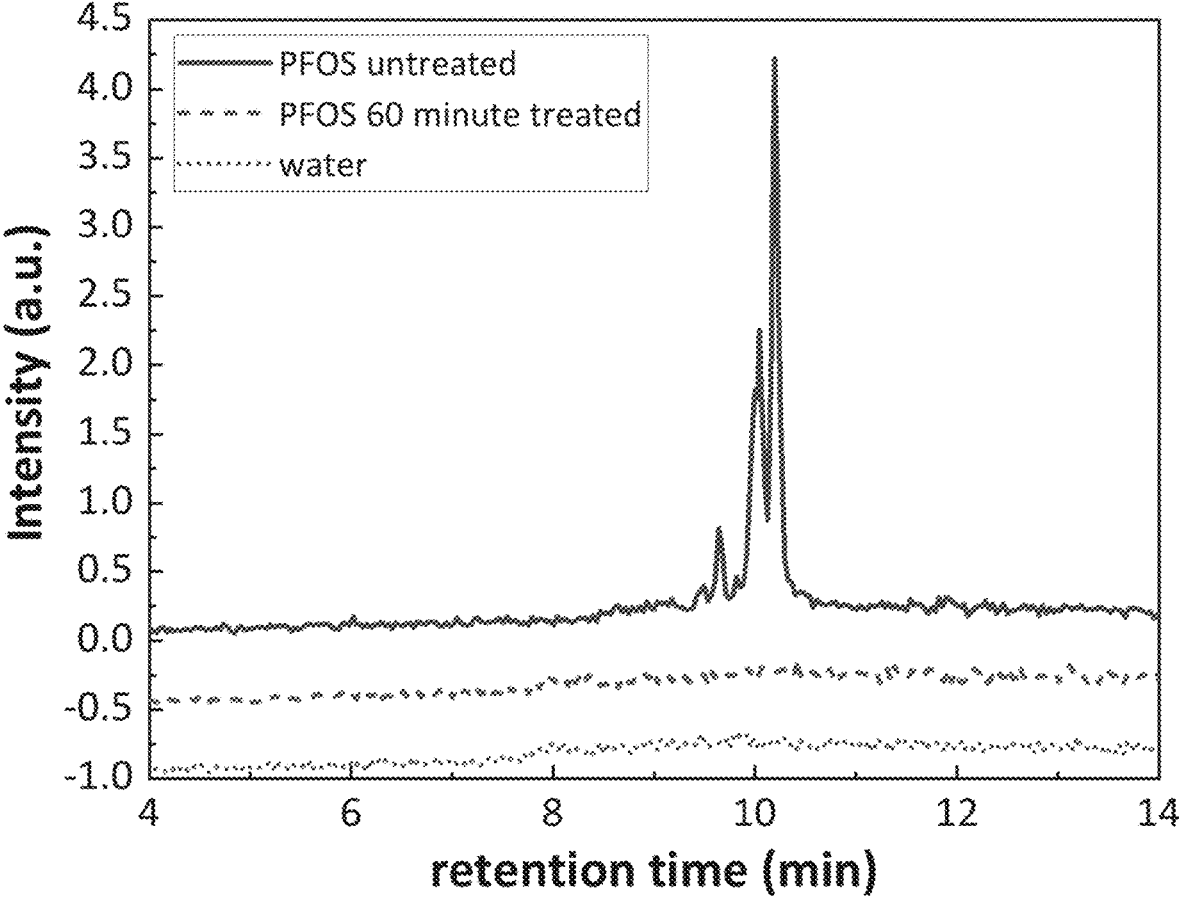
FIG. 2 is a plot illustrating reduction of perfluorooctane sulfonate (PFOS) in water using a plasma-based decontamination system and method in accordance with the present invention.

An example of the system's use to successfully destroy PFOS is shown by the plots in FIGS. 2 and 3A/3B. The results reflected in these plots were generated using a pulsed power supply to drive plasma production and the PFOS concentration was determined after a given liquid volume was passed through the system sequentially. Plasmas were produced using short duration (50-400 ns), high voltage (20 kV) pulses, operating at modest frequencies (0.5-10 kHz). No filter material was used for these results.

As shown in FIG. 2, complete removal of PFOS from the liquid after prolonged plasma treatment is possible. FIG. 2 includes the total ion count spectrogram obtained by Liquid Chromatography Mass Spectrometry (LCMS) of PFOS contaminated water before and after plasma treatment. The LCMS signal corresponding to PFOS completely disappears as a consequence of the plasma treatment and no degradative by-products were observed within the sensitivity of the instrument. The results for clean water are included as a reference. For these result the contaminated water was repeatedly cycled through the reaction chamber without any filter material present. The presence of filter material is expected to improve the process.

The plots in FIGS. 3A and 3B show how operating parameters influence the degradation process. Importantly, the results also suggest a certain flexibility in choosing operating conditions.

The plot in FIG. 3A shows the relative concentration of PFOS remaining in the liquid as a function of passes through a reaction chamber such as that shown in FIG. 1, in which different power supply operating parameters (pulse width and frequency) were used to generate the plasma. As can be seen from the plot in FIG. 3A, while the absolute percentages of the PFOS remaining in the liquid vary with the power supply operating parameters applied, with longer pulse duration and higher frequencies providing the greatest reduction, in all cases the percentage of PFOS remaining in the liquid shows a steady decline as the number of passes through the plasma increases, irrespective of the power supply operating parameters used. The plot in FIG. 3B shows the same results as shown in FIG. 3A, but as a function of plasma exposure time, i.e., how much time the treated liquid was exposed to the plasma, by converting the number of passes through the reaction chamber to exposure time. For these result were obtained without any filter material present. The presence of filter material is expected to improve the process.

FIG. 4 is a plot illustrating the relative concentration of PFOS remaining in a liquid as a function of the energy required to drive a plasma with different frequencies in a plasma-based decontamination method in accordance with the present invention using different operating. The plot in FIG. 4 shows same results of FIG. 3A and FIG. 3B at a constant pulse width, but as a function of the power required to drive the plasma.

Advantages and New Features

Plasma treatment and filtering are approaches to removing the contaminants in water. Combining these approaches in a single device and method—particularly for the destruction of PFAS in water—provides synergistic results. For example, destruction of PFAS molecules via plasma exposure can lead to small fragments of the parent molecule, including shorter chain perfluoroalkyl carboxylic acids (PFCAs), perfluoroalkyl sulfonic acids (PFSAs), carbon dioxide, fluoride ions and sulfate ions. See K. Tachibana et al., "Reaction Process of Perfluorooctanesulfonic Acid (PFOS) Decomposed by DC Plasma Generated in Argon Gas Bubbles," *IEEE Trans. Plasma Sci.* 2014, 42 (3), 786-793. As noted above, the work of Ross, et al. indicates that GAC performs poorly with shorter chain PFAS variants, while IX resins do better. See Ross et al., supra. As such, plasma treatment, when combined with IX resins, can serve to both rapidly and significantly reduce the amount of both long and short chain PFAS as well as the daughter fragments in the water being treated.

The ability to regenerate the filter material in situ also provides a distinct operational advantage. As stated above, typical non-thermal approaches involve the removal of PFAS using either an organic solvent rinse when treating hydrophobic media like GAC or high ionic strength salt solutions when treating IX resins. However, these approaches are ineffective at fully regenerating the sorption capacity of the matrices due to incomplete desorption, while also generating additional solvent waste. The use of thermal processes, on the other hand, result in the destruction of the material and the generation of harmful degradation products. In contrast, the present invention enables the regeneration of the filter without the need to remove or otherwise treat the filter, with the particles desorbed from the filter being output from the reaction chamber via the outlet. Importantly, the process is nondestructive and the materials do not have to be removed from the reaction chamber, which represents a real cost savings in terms of raw materials, labor, and down time.

Lastly, the electrode geometry and system operation associated with plasma production is optimized for treating liquids. In particular, the system is designed to produce one or more plasma volumes within the liquid, i.e., one or more plasmas surrounded by liquid, to ensure that the plasma terminates at the liquid interface. Moreover, the mixing of the liquid and gas produces a plasma volume with a very large plasma-liquid interface and small local liquid volume, which provides a large exposed liquid surface area and minimizes the penetration depth needed to treat the liquid. This combination of attributes enhances the delivery of active plasma species to the liquid and contaminants of interest, thus optimizing the remediation and destruction process.

Alternative Embodiments

Numerous alternative embodiments of the apparatus described herein may be employed. Such alternative embodiments can be configured to provide the best results for an intended decontamination application and/or the scale of the intended application.

Some such alternative embodiments of an apparatus for plasma-based decontamination of a liquid in accordance with the present invention are illustrated by the schematics in FIGS. 5A-5D.

Figure 5A:
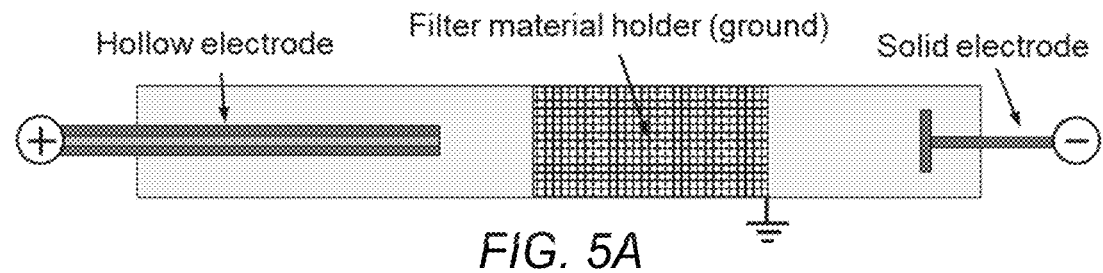

The embodiment illustrated in FIG. 5A illustrates how a bipolar power supply without ground could be joined to the reaction chamber and still maintain a grounded filter material. Specifically, a power supply such as power supply 104 shown in FIG. 1, with positive and negative voltage leads capable of providing a potential difference between the leads, is connected to the electrodes located on either end of the reaction chamber. In this embodiment, the hollow electrode is connected to the positive lead and the solid electrode is connected to the negative lead. The filter material holder, filled with filter material, is located between the leads and connected to ground. Note here that there is the potential to generate additional plasma between the filter cage and the negative electrode, while operating in the filter material treatment mode.

Figure 5B:
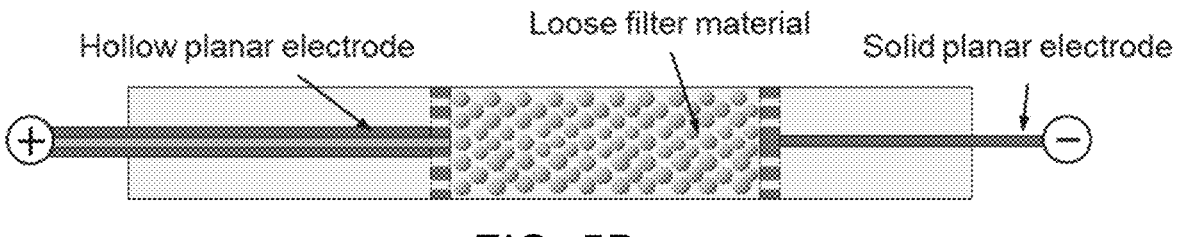

FIG. 5B illustrates how the system can be designed to provide for nearly simultaneous plasma exposure and filtering of the liquid. In the embodiment illustrated in FIG. 5B, loose filter material is held between the two electrodes, where the ends of the electrodes are planar disks with holes that allow liquid and gas, but not the filter material, to pass through the electrodes. When power is applied to the electrodes, a plasma is generated in and around the filter material, thus exposing the liquid to the plasma while the liquid is moving through the filter material.

Figure 5C:
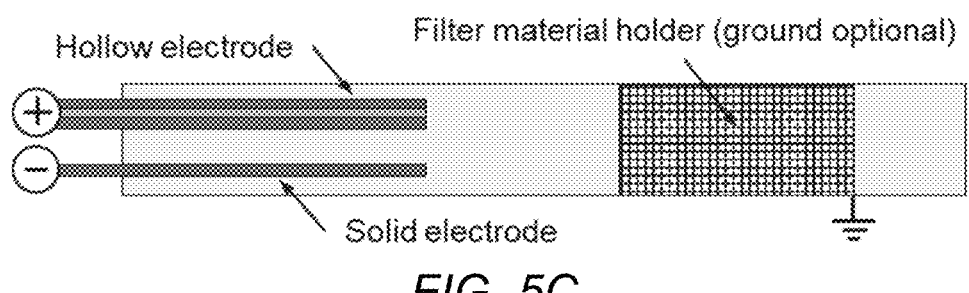

FIG. 5C illustrates an embodiment in which both electrodes are inserted at the same end of the reaction chamber. The electrodes are located adjacent to one another and are both attached to the power supply to generate the plasma. The filter material holder, filled with filter material, is located downstream from the electrodes and is attached to ground. In this embodiment, the liquid flows through the plasma generated between the two electrodes and then through the filter, with the liquid being decontaminated by the plasma and the filter as described above.

Figure 5D:
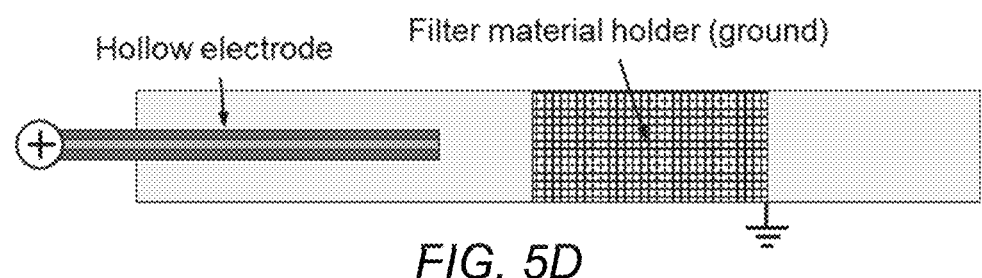

FIG. 5D illustrates an embodiment in which monopolar power is applied to the reaction chamber. In this embodiment, the power supply provides a positive output that is connected to the hollow electrode, and the filter material holder, filled with filter material, is connected to ground and serves as the return current electrode.

In all of these embodiments, the gas is delivered through a powered electrode that is submerged in the liquid. The ground or negative electrode can assume a large variety of geometries, may or may not serve as the filter material holder, and may be located on either side of the filter material. When the filter material holder is not part of the circuit needed to drive plasma production (i.e. acting as an electrode), it can be made of insulating material. Alternatively, the filter material may be loaded between the two electrodes, where the electrodes can be perforated to accommodate liquid flow through the system. In addition, in all of the embodiments shown in FIGS. 5A-5C above, the negative electrode can be connected to ground to enable a monopolar power supply to be used as described in the embodiment of FIG. 5D.

There are three general approaches to scaling the apparatus to accommodate larger throughput: increase liquid flow, increase the system diameter, or parallelize the process. Changing the system diameter would generally require that all components increase in diameter, but in practice, tube and electrode diameters need not scale at the same rate. Alternatively, a given volume of water could be treated faster by employing multiple apparatus in parallel. Such a configuration could be operated using a single sources for liquid, gas, and power. However, using a single power supply to drive multiple electrodes in parallel may require electrical ballasting to ensure equal distribution across all electrodes.

As noted above, the choice of filter material and/or configuration of the filter can also be tuned depending on the intended application. In many embodiments, the filter material can comprise granular activated carbon (GAC), ion exchange (IX) resins, or polymers, but any other suitable filter material or combination of materials can be used in single- or multi-stage filters to obtain a predetermined level of decontamination, depending on the liquid to be treated and the level of decontamination desired.

This new concept in plasma remediation combines plasma exposure and filtration to destroy or remove contaminants in water, while also providing the ability to independently destroy or remove the contaminants adsorbed on solid sorbents used as filtration media. Importantly, the combined use of submerged plasmas within the liquid as an initial treatment step to reduce or break up contaminants at the plasma-liquid interfaces, followed by filtration of the liquid to remove the contaminates increases the efficacy of remediation, and the ability to regenerate the filtration material in situ minimizes resource use. This combination of attributes leads to a more efficient and cost-effective approach to liquid remediation than is provided by decontamination systems in the prior art.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. An apparatus for decontamination of a liquid, comprising:

a reaction chamber having a first end and a second end opposite the first end, said reaction chamber comprising an inlet at the first end, an outlet at the second end, and a filter proximate to the second end;

a hollow tube electrode and a solid electrode, each of the hollow tube and solid electrodes extending into the reaction chamber, a portion of each of the hollow tube electrode and the solid electrode being submerged within a liquid flowing through the reaction chamber; a power supply connected to the hollow tube electrode and to the solid electrode; and wherein a gas is introduced into the reaction chamber at the first end via the hollow tube electrode, the gas contacting both the hollow tube electrode and the liquid, a plasma volume being generated from the gas when a voltage from the power supply is applied across the hollow tube electrode and the solid electrode;

wherein the liquid surrounds the plasma volume as it flows through the inlet of the reaction chamber to the outlet, the plasma causing parent species contaminant molecules in the liquid to break apart into daughter products comprising smaller molecular fragments as it contacts the liquid;

wherein the liquid then passes through the filter situated between the plasma volume and the outlet from the reaction chamber; and wherein the parent species and daughter products in the liquid are adsorbed by the filter before the liquid is output from the reaction chamber via the outlet.

2. The decontamination apparatus according to claim 1, wherein the hollow tube electrode is situated at the first end of the reaction chamber and the solid electrode is situated at the second end of the reaction chamber.

3. The decontamination apparatus according to claim 1, wherein the hollow tube electrode is connected to a positive voltage lead from the power supply and the solid electrode is connected to a negative voltage lead from the power supply.

4. The decontamination apparatus according to claim 1, wherein said filter comprises filter material, wherein the electrodes have ends that are planar disks with holes that allow liquid and gas, but not the filter material, to pass through the electrodes such that when power is applied to the electrodes, a plasma is generated in and around the filter material, exposing the liquid to the plasma while the liquid is flowing through the filter material.

5. The decontamination apparatus according to claim 1, wherein both the hollow tube electrode and the solid electrode are situated at the first end of the reaction chamber, the plasma being generated between the hollow tube electrode and the solid electrode.

6. The decontamination apparatus according to claim 1, wherein the gas comprises helium (He), xenon (Xe), argon (Ar), neon (Ne), or mixtures thereof.

7. The decontamination apparatus according to claim 1, wherein the gas comprises oxygen ($O_2$), nitrogen ($N_2$), air, or mixtures thereof.

8. The decontamination apparatus according to claim 1, wherein the filter comprises granular activated carbon (GAC), ion exchange (IX) resins, or polymer fibers.

* * * * *